United States Patent
Bodla et al.

(10) Patent No.: US 10,193,421 B2
(45) Date of Patent: Jan. 29, 2019

(54) SYSTEM FOR THERMAL MANAGEMENT IN ELECTRICAL MACHINES

(71) Applicant: General Electric Company, Schenectady, NY (US)

(72) Inventors: Karthik Kumar Bodla, Watervilet, NY (US); Manoj Ramprasad Shah, Latham, NY (US); Steven Joseph Galioto, Waterford, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 250 days.

(21) Appl. No.: 14/940,712

(22) Filed: Nov. 13, 2015

(65) Prior Publication Data

US 2017/0141655 A1   May 18, 2017

(51) Int. Cl.
*H02K 9/22* (2006.01)
*H02K 3/34* (2006.01)

(52) U.S. Cl.
CPC ...................... *H02K 9/22* (2013.01)

(58) Field of Classification Search
CPC .......... H02K 3/345; H02K 3/387; H02K 9/22; H02K 3/487; H02K 3/48; H02K 1/276; H02K 2201/06
USPC .................................................. 310/214, 215
See application file for complete search history.

(56) References Cited

U.S. PATENT DOCUMENTS

| | | | | |
|---|---|---|---|---|
| 4,001,616 A | * | 1/1977 | Lonseth | H02K 3/40 174/102 SC |
| 4,691,119 A | * | 9/1987 | McCabria | H02K 7/116 290/4 C |
| 5,264,750 A | * | 11/1993 | Abate | H02K 3/48 310/180 |
| 6,288,460 B1 | * | 9/2001 | Fakult | H02K 3/24 310/179 |
| 6,437,468 B2 | | 8/2002 | Stahl et al. | |

(Continued)

FOREIGN PATENT DOCUMENTS

| CN | 2706609 A | 6/2005 |
|---|---|---|
| CN | 101785170 A | 7/2010 |

(Continued)

OTHER PUBLICATIONS

Liu, H.-P. et al., "Splits of windage losses in integrated transient rotor and stator thermal analysis of a high-speed alternator during multiple discharges", Electromagnetic Launch Technology, 2004. 2004 12th Symposium on, May 25-28, 2005, pp. 217-222.

(Continued)

*Primary Examiner* — Naishadh Desai
(74) *Attorney, Agent, or Firm* — GE Global Patent Operation; Nitin Joshi

(57) ABSTRACT

A component of an electrical machine is disclosed. The component includes a core including a plurality of slots, a magnetic field-generating component disposed in at least one slot of the plurality of slots, and a heat dissipating element disposed in a slot of the plurality of slots, in contact with the magnetic field-generating component. The heat dissipating element includes a thermally conductive material having an in-plane thermal conductivity higher than a through-plane thermal conductivity.

17 Claims, 8 Drawing Sheets

(56) References Cited

U.S. PATENT DOCUMENTS

| | | | |
|---|---|---|---|
| 6,844,651 B1* | 1/2005 | Swift | H02K 3/48 310/214 |
| 6,888,286 B2 | 5/2005 | Howard et al. | |
| 7,187,096 B2 | 3/2007 | Wang et al. | |
| 8,115,361 B2 | 2/2012 | Iki et al. | |
| 8,487,500 B2* | 7/2013 | Cullen | H02K 9/005 310/215 |
| 8,513,842 B2 | 8/2013 | Iwasaki et al. | |
| 2002/0053850 A1* | 5/2002 | Shah | H02K 21/042 310/166 |
| 2003/0011254 A1* | 1/2003 | Ukaji | G03F 7/70758 310/64 |
| 2004/0119364 A1* | 6/2004 | Thiot | H02K 3/48 310/215 |
| 2011/0080066 A1* | 4/2011 | Doi | H02K 1/276 310/156.43 |
| 2012/0080976 A1* | 4/2012 | Oka | H02K 3/325 310/215 |
| 2012/0091848 A1* | 4/2012 | Sakai | H02K 1/2766 310/156.43 |
| 2012/0319525 A1* | 12/2012 | Xu | H02K 3/487 310/214 |
| 2013/0270956 A1* | 10/2013 | Yamaguchi | H02K 1/27 310/156.27 |
| 2014/0021811 A1* | 1/2014 | Hamer | H02K 9/22 310/52 |
| 2014/0042840 A1 | 2/2014 | Chamberlin et al. | |
| 2014/0054979 A1* | 2/2014 | Sugita | H02K 9/20 310/12.29 |
| 2014/0070658 A1 | 3/2014 | Hamer | |

FOREIGN PATENT DOCUMENTS

| | | |
|---|---|---|
| IN | 201001587 P4 | 8/2010 |
| JP | 59117435 A | 7/1984 |
| JP | 2007236045 A | 9/2007 |

OTHER PUBLICATIONS

Wang et al., "Design and develop of a MW direct drive high-speed permanent-magnet machine for compression", Electrical Machines and Systems (ICEMS), 2013 International Conference on, Oct. 26-29, 2013, Busan,pp. 892-895.

Raminosoa et al., "Electrical machine cooling structure",Pending U.S. Appl. No. 14/716,415, filed May 19, 2015, 27 Pages.

* cited by examiner

SYSTEM FOR THERMAL MANAGEMENT IN ELECTRICAL MACHINES

BACKGROUND

The present disclosure relates generally to electrical machines, and more particularly to thermal management in electrical machines.

Higher temperatures in electrical machines can be a source of performance degradation, decrease in power density, and reduction in reliability for the machine. Thermal "hot spots" may be a specific manifestation of such an issue. Within the components of the electrical machines, for example, a stator and a rotor, the conductors within the slots and/or poles are often among the hottest portions of the electrical machines due to large ohmic losses. For example, the majority of ohmic losses in a stator, such as copper losses, are concentrated in the stator slots due to generation of heat by the winding conductors located in the slots.

Heat generated due to ohmic losses within the components need to be transmitted through insulation layers (e.g., ground wall, phase separators, conductor coating, VPI resin, and the like). The extraction of heat from such areas may not be effective due to the poor thermal conductivity of the various insulation layers.

Accordingly, there is a need for an enhanced thermal management in electrical machines.

BRIEF DESCRIPTION

In one aspect, a component of an electrical machine is disclosed. The component includes a core including a plurality of slots, a magnetic field-generating component disposed in at least one slot of the plurality of slots, and a heat dissipating element disposed in a slot of the plurality of slots, in contact with the magnetic field-generating component. The heat dissipating element includes a thermally conductive material having an in-plane thermal conductivity higher than a through-plane thermal conductivity.

In one aspect, a component of an electrical machine includes a magnetic core including teeth defining a plurality of slots, wherein each slot from the plurality of slots is defined between corresponding pair of adjacent teeth; a conduction winding disposed in at least one of the plurality of slots; and a heat dissipating element disposed within the conduction winding. The heat dissipating element includes a thermally conductive material having an in-plane thermal conductivity higher than a through-plane thermal conductivity.

In one aspect, a rotor of an electrical machine is disclosed. The rotor includes a rotor core including a plurality of slots, a permanent magnet disposed in a slot from the plurality of slots, and a heat dissipating element disposed in contact with the permanent magnet. The heat dissipating element includes a thermally conducting material having an in-plane thermal conductivity higher than a through-plane thermal conductivity.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art with respect to the presently disclosed subject matter. The terms "a", "an", and "the" do not denote a limitation of quantity, but rather denote the presence of at least one of the referenced item. The terms "front", "back", "bottom", and/or "top", unless otherwise noted, are used for convenience of description only and are not limited to any one position or spatial orientation.

If ranges are disclosed, the endpoints of all ranges directed to the same component or property are inclusive and independently combinable (e.g., ranges of "up to about 25 wt. %" is inclusive of the endpoints and all intermediate values of the ranges of "about 5 wt. % to about 25 wt. %," etc.). The term "about" is used in connection with a quantity that is inclusive of the stated value and has the meaning dictated by the context (e.g., includes the degree of error associated with measurement of the particular quantity). Accordingly, a value modified by the term "about" is not necessarily limited only to the precise value specified.

Figure 1:
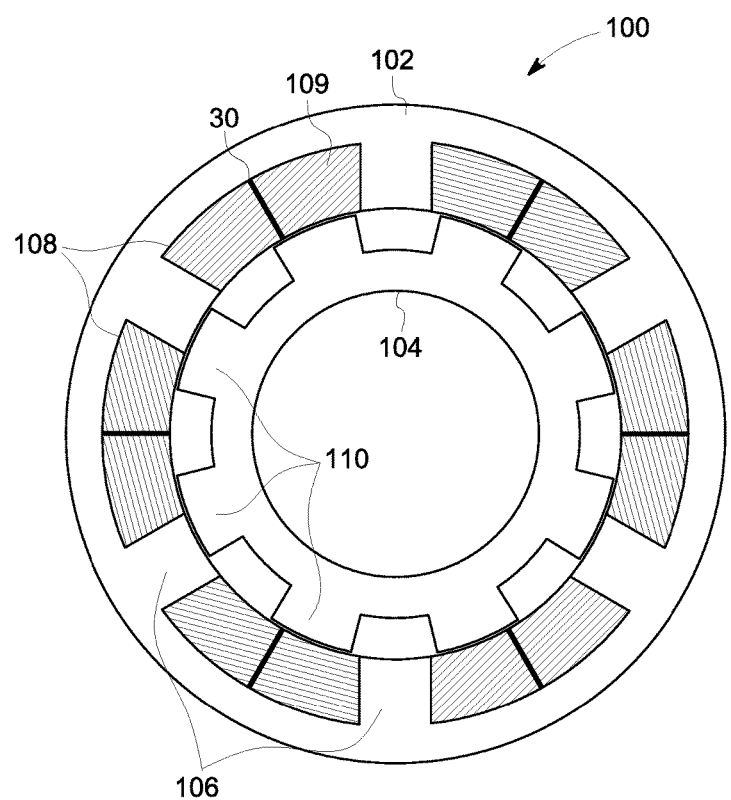
FIG. 1 is a schematic sectional view of an electrical machine in accordance with one embodiment.

Some embodiments are directed to a component of an electrical machine. Typically, an electrical machine includes a static component and a movable component positioned proximate to each other, the movable component is configured to move relative to the static component. FIG. 1 shows a schematic sectional view of an electrical machine 100 in accordance with one exemplary embodiment. In the illustrated embodiment, the electrical machine 100 is a radial flux electrical machine. The radial flux electrical machine 100 includes a stator 102 and a rotor 104 disposed concentric to the stator 102. The stator 102 includes a plurality of teeth 106. Each pair of teeth 106 defines a slot 108 between adjacent teeth 106. The stator 102 includes a conduction winding 109 disposed at least in one slot 108. The rotor 104 includes a plurality of magnetic poles provided by the rotor teeth 110. A heat dissipating element 30 is also disposed in at least one slot 108 of the stator 102 such that the slot 108 includes both the conduction winding 109 and the heat dissipating element 30. In some embodiments, the heat dissipating element 30 is disposed internal to the conduction winding 109. Each of the corresponding slots 108 can include the conduction winding 109 and heat dissipating element 30.

Figure 2:
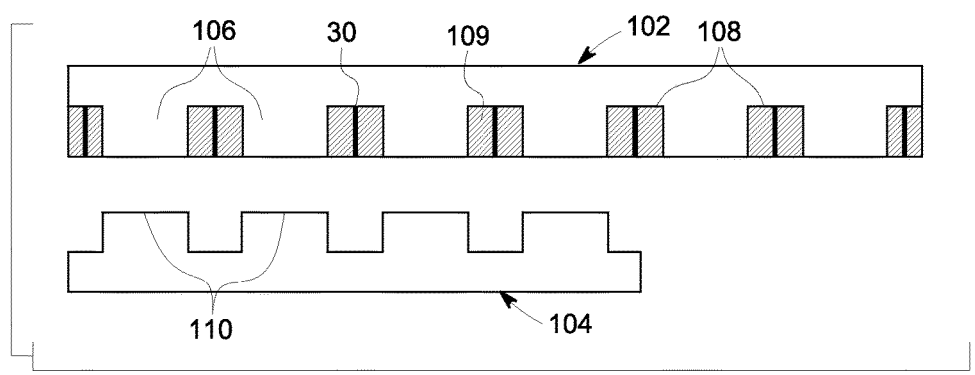
FIG. 2 is a schematic sectional view of an electrical machine in accordance with another embodiment.

FIG. 2 shows a schematic sectional view of an electrical machine 100 in accordance with another exemplary embodiment. In the illustrated embodiment, the electrical machine 100 is a linear electrical machine. The rotor 104 is movable along an axial direction (may also be referred to as a transporter) relative to the stator 102. The stator 102 includes stator teeth 106 with slots 108 there between. The slots 108 in at least some examples, include the heat dissipating element 30 and conduction winding 109. In some embodiments, the rotor 104 and the stator 102 are axially adjacent.

The electrical machine may be an electrical motor, wherein the rotor moves relative to the stator to convert electrical energy to mechanical energy. Alternatively, the electrical machine may be an electrical generator, wherein the motion of the rotor relative to the stator, converts mechanical energy to electrical energy. In some embodiments, the rotor is disposed within a stator. In some other embodiments, the stator is disposed within a rotor.

According to some embodiments, the component of the electrical machine is a stator or a rotor. The component, in one example, is a magnetic core having a stator having plurality of slots between corresponding stator teeth or a rotor with rotor teeth defining the respective magnetic fields. In the stator, there is a magnetic field-generating element disposed in at least one slot of the plurality of slots. The component further includes a heat dissipating element disposed in at least one slot of the plurality of slots. The heat dissipating element is disposed such that it is in contact with the magnetic field-generating element. The heat dissipating element includes a thermally conducting material having an 'in-plane' thermal conductivity higher than a 'through-plane' thermal conductivity.

As used herein, the term "magnetic field-generating element" refers to a component or an element that induces/generates magnetic field during operation of the electrical machine. In some embodiments, the magnetic field-generating element includes a coil that includes electrically conductive windings, for example, copper windings. In some other embodiments, the magnetic field-generating element includes a permanent magnet.

As used herein, the term "radially" or "radial direction" or "radial axis" refers to a direction along a radius relative to a central axis of the cylindrical component.

Figure 3:
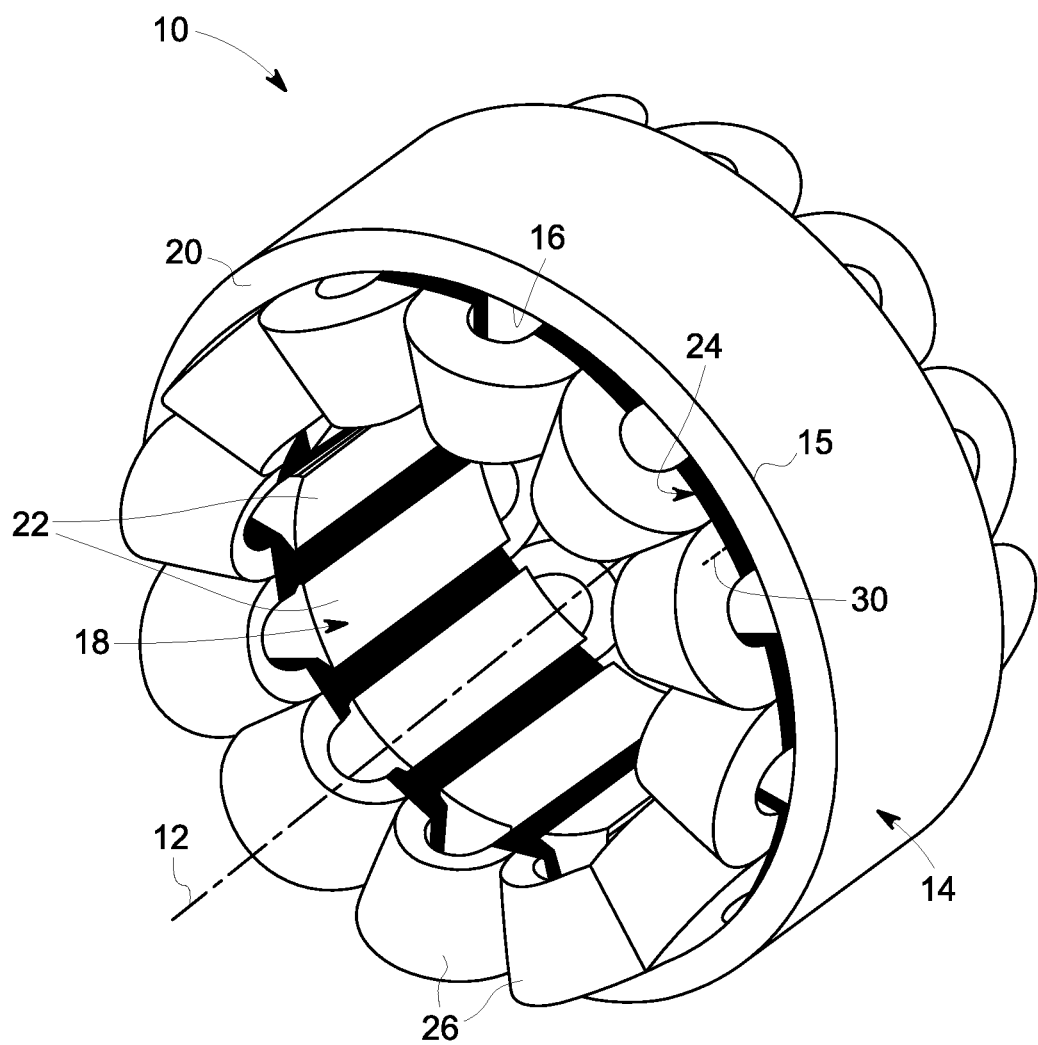
FIG. 3 is a perspective view of a component of an electrical machine, in accordance with one embodiment.

FIG. 3 shows a perspective view of a component 10 for an electrical machine. It should be noted that the component 10 discussed herein may be similar to the stator 102 or the rotor 104 discussed with reference to FIGS. 1 and 2. In the illustrated embodiment, the component 10 has a cylindrical shape. The component 10 includes a core (also referred to as "magnetic core") 14 which is configured to generate a magnetic field. The core 14 includes an outer surface 15 and an inner surface 16 that defines a central opening 18. The central opening 18 extends along a central longitudinal axis 12. The core 14 may be formed of a plurality of circular laminations (not shown) stacked together along the central longitudinal axis 12.

As illustrated, the core 14 includes a yoke 20 and teeth 22. The yoke 20 may also be referred to as a stator yoke or a rotor yoke. In some embodiments, the yoke 20 includes an iron yoke. The teeth 22 extend radially inward from the yoke 20. The teeth 22 define a plurality of slots 24 in-between.

The component 10 includes a magnetic field-generating element 26 disposed in at least one slot of the plurality of slots 24. In the illustrated embodiment, the magnetic field-generating component 26 includes a conduction winding. The conduction winding 26 is composed of a plurality of coils (not shown), which is wound around the teeth 22. The conduction winding 26 extends through the slot 24 and is wound around the teeth 22. In some embodiments, each slot 24 accommodates at least one conduction winding 26. In certain embodiments, the conduction winding 26 includes copper winding. The conduction windings 26 may include one or more direct current (DC) coils and/or one or more alternating current (AC) coils. The number of phases of each coil may vary depending on the application. In some embodiments, the conduction winding is insulated using a resin. In certain other embodiments, the conduction winding 26 is composed of a plurality of fractional-slot concentrated coils. The component 10 further includes a heat dissipating element 30 disposed in the plurality of slots 24, in contact with the conduction winding 26.

Figure 4:
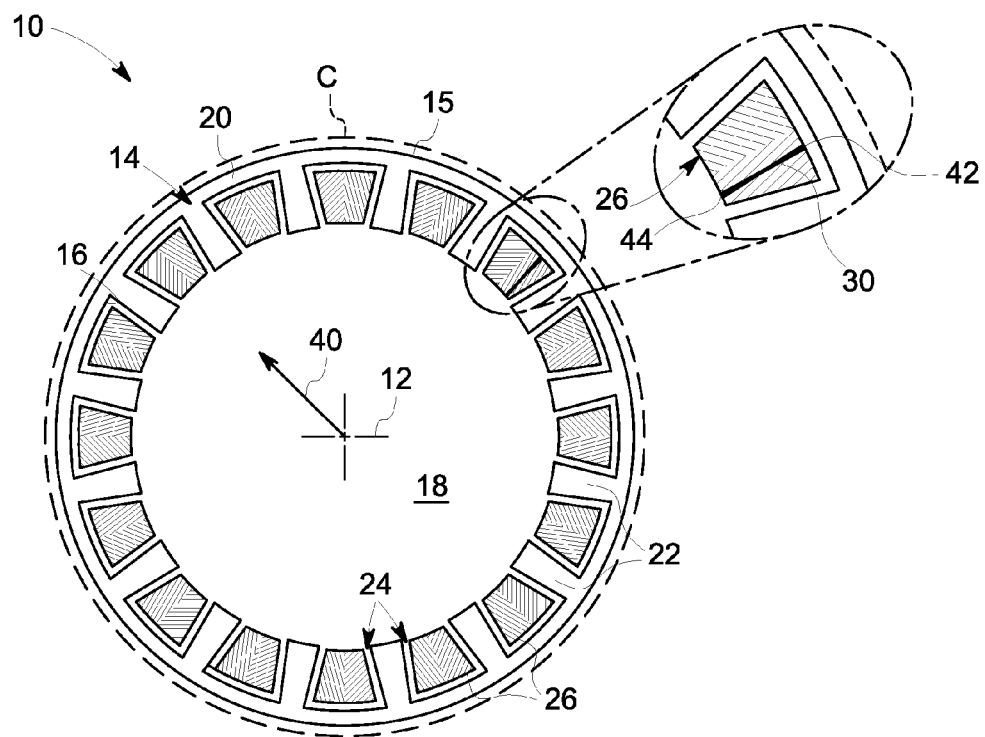
FIG. 4 is a schematic cross-sectional view of the component of FIG. 3 in accordance with one embodiment.

FIG. 4 shows a schematic of cross-sectional view of the component 10 in accordance with the embodiment of FIG. 3. The teeth 22 are arranged radially about the central longitudinal axis 12 such that the teeth 22 are spaced apart from each other along the circumference "C" of the magnetic core 14. Each slot 24 extends between corresponding adjacent teeth 22 of the core 14. The number of teeth 22 and slots 24 may vary depending on the application. Further, the number of field coils 26 may also vary depending on the application.

Figure 6:
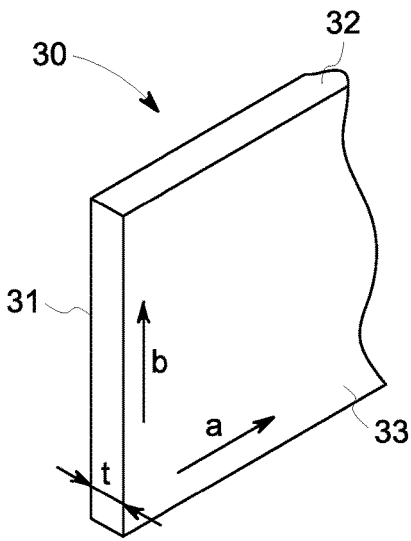
FIG. 6 is a perspective view of a heat dissipating element in accordance with one embodiment.

In the illustrated embodiment, the heat dissipating element 30 is disposed inside the conduction windings of the field coil 26. The heat dissipating element 30 includes a sheet-like element 32 (as shown in FIG. 6). As illustrated, the sheet-like element 32 is disposed inside the field coil 26 such that a plane of the sheet-like element 32 is substantially parallel to a radial direction 40 of the component 10. A first end 42 of the sheet-like element 32 is disposed proximate to the yoke 20 and a second end 44 of the sheet-like element 32 is disposed away from the yoke 20. As used herein, "substantially parallel" refers to a plane of the sheet-like element 32 that extends parallel to the radial axis. In some embodiments, the plane may deviate from about −10 degrees to about 10 degrees from the radial axis 40. In some embodiments, the heat dissipating element 30 extends from one end to another end of the field coil 26, along the central longitudinal axis 12 of the component 10.

Figure 5:
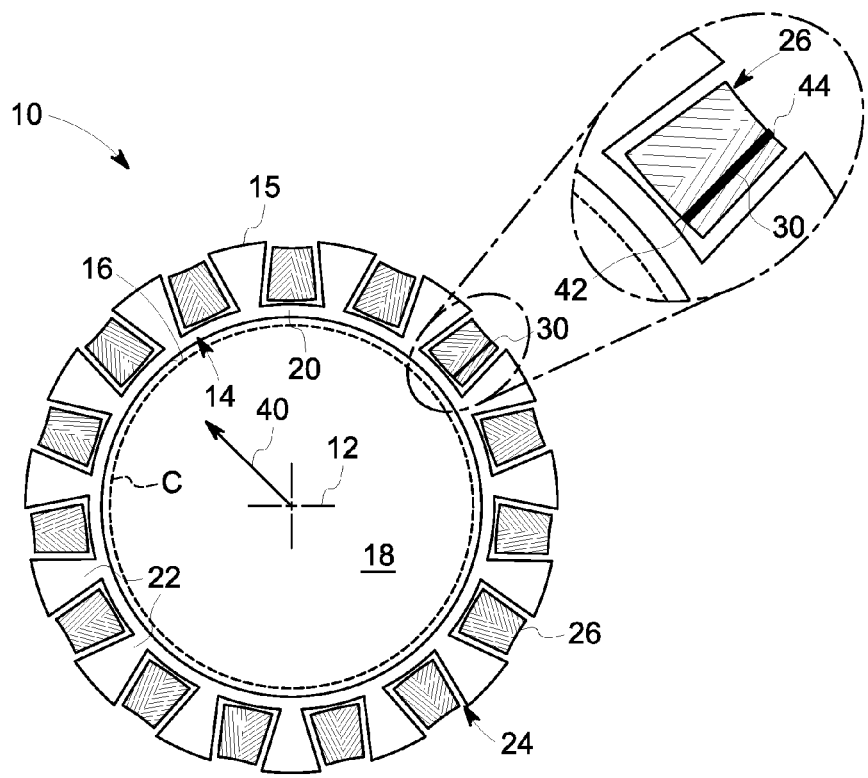
FIG. 5 is a schematic cross-sectional view of a component in accordance with another embodiment.

FIG. 5 shows a schematic cross-sectional view of the component 10 in accordance with another embodiment. In the illustrated embodiment, the teeth 22 extend radially outward from the yoke 20 compared to the previous embodiment in FIG. 4. Each slot 24 extends between corresponding adjacent teeth 22 of the core 14.

The heat dissipating element 30 conducts heat along the substantially radial direction 40 from the field coil 26 to the core 14. In some embodiments, the sheet-like element 32 of the heat dissipating element 30 conducts heat from the second end 44 to the first end 42. The heat then dissipates from the first end 42 of the heat dissipating element 30 to the yoke 20 of the core 14. A cooling fluid may be circulated along a surface of the yoke 20 or an outer surface of the core 14 to dissipate the heat from the core 14. The cooling fluid may include, air, oil, or water, for example, a water-glycol mixture.

FIG. 6 represents a schematic perspective view of the heat dissipating element 30. As discussed previously, the heat dissipating element 30 includes the sheet-like element 32. In some embodiments, the heat dissipating element 30 may include a plurality of sheet-like elements 32. The term, "sheet-like element" may be referred to as an element having a thickness significantly less than a width and a length of the element. As shown, the sheet-like element 32 has two opposing faces 31, 33. In some embodiments, the faces 31, 33 may contact one or more portions of the component 10. In some other embodiments, the faces 31, 33 may not be in physical contact with the component 10. In such embodiments, the thermal conductivity of the heat dissipating element 30 enables heat conduction from the component 10.

In the illustrated embodiment, the sheet-like element 32 has a length 'a', a width 'b' and a thickness 't'. In one example, a suitable thickness of the sheet-like element 32 is in a range from about 15 µm to about 100 µm (i.e., about 0.66 mils to about 4 mils). The sheet-like element 32 is made of a thermally conducting material having a high thermal conductivity and high flexibility. As noted, the thermally conducting material has an 'in-plane' thermal conductivity higher than a 'through-plane' thermal conductivity. As used herein, the term 'in-plane thermal conductivity' refers to the thermal conductivity along a plane i.e., perpendicular to the thickness (for example, along the face 33) of the sheet-like element 32. The term, 'through-plane thermal conductivity' refers to the thermal conductivity through the plane, i.e. along a perpendicular direction to the plane of the sheet-like element 32.

One suitable thermally conducting material of the sheet-like element 32 includes graphite. Graphite has high thermal conductivity and a high degree of flexibility with ease of cutting/trimming. Although graphite sheets exhibit anisotropic attributes with regard to thermal conductivity, the sheet-like elements 32 made of graphite, need not be anisotropic. In some embodiments, a plurality of graphite sheets may be stacked one over the other to form the sheet-like element 32. Other suitable thermally conducting materials may include, for example, aluminum nitride, boron nitride, silicon carbide, and the like. A combination of such materials can be also used for manufacturing the heat dissipating element 30.

As used herein, in one embodiment, the term "high thermal conductivity" may be referred to a thermal conductivity above 1 W/m-K. Specifically, the thermal conductivity of the sheet-like element 32 is higher than the inherent thermal conductivity of the adjacent electrical machine elements (i.e., slots, windings, and resin, etc.). In some embodiments, the thermal conductivity of the sheet-like element 32 is higher than 10 W/m-K. In certain other embodiments where the sheet-like element 32 is made of graphite, the thermal conductivity of the sheet-like element 32 is in a range from about 650 W/m-K to about 1,799 W/m-K.

In some embodiments, the sheet-like element 32 of the heat dissipating element 30 conducts heat along the faces 31, 33 from the second end 44 to the first end 42 (FIGS. 4 and 5). The heat then dissipates from the first end 42 of the heat dissipating element 30 to the yoke 20 of the core 14.

Figure 7:
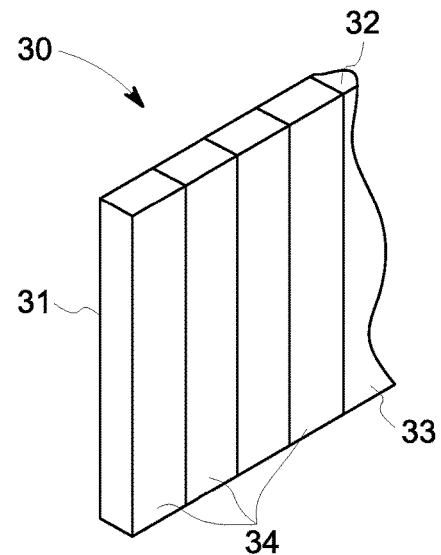
FIG. 7 is a perspective view of a heat dissipating element in accordance with yet another embodiment.

FIG. 7 is a perspective view of the heat dissipating element 30 in accordance with yet another embodiment. In the illustrated embodiment, the sheet-like element 32 of the heat dissipating element 30 includes a plurality of segments 34 disposed along the length 'a' (as shown in FIG. 6) to impede the heat conduction along a predefined direction. For example, a segment of the plurality of segments 34 may extend substantially along the radial direction of the component. The plurality of segments 34 of the sheet-like element 32 may be arranged proximate to each other or spaced apart from each other along the longitudinal direction of the heat dissipating element 30. In some embodiments, the plurality of segments 34 may be disposed at different locations within the field coil. The segments 34 are configured to restrict the heat conduction along the longitudinal direction of the component and allow heat conduction along the radial direction of the component to dissipate heat.

Figure 8:
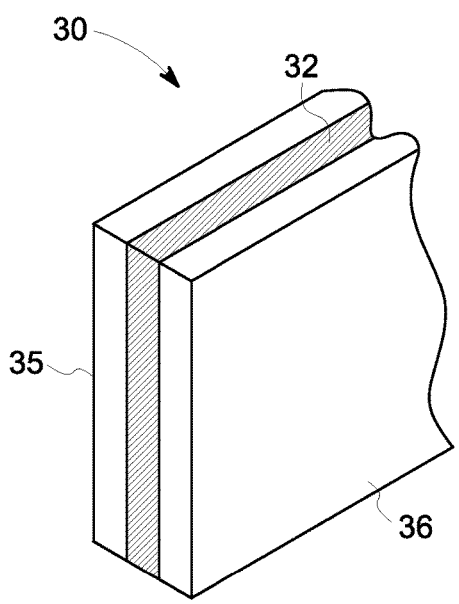
FIG. 8 is a perspective view of a heat dissipating element in accordance with another embodiment.

FIG. 8 is a schematic perspective view of the heat dissipating element 30 in accordance with yet another exemplary embodiment. In the illustrated embodiment, the heat dissipating element 30 includes the sheet-like element 32 made of the thermally conducting material interdisposed between a pair of electrically insulating layers 35, 36. The electrically insulating layers 35, 36 electrically isolate the sheet-like element 32 from adjacent components in the electrical machine and thus avoid electrical conduction through the sheet-like element 32. In some embodiments, the layer 35, 36 may contact one or more portions of the component 10. In some other embodiments, the layer 35, 36 may not be in physical contact with the component 10. In some embodiments, the plurality of segments 38 may be disposed at different locations within the conduction winding 26.

Figure 9:
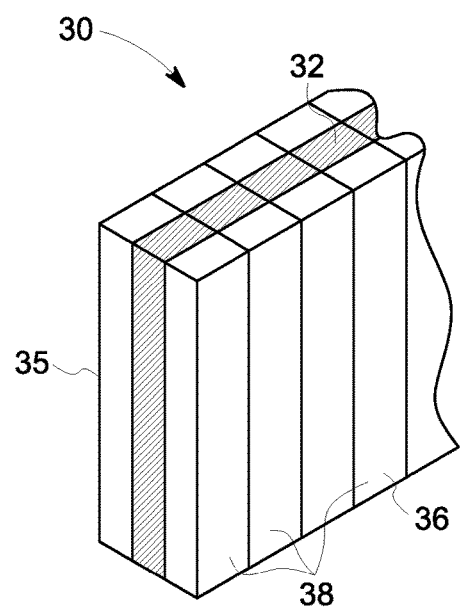
FIG. 9 is a perspective view of a heat dissipating element in accordance with yet another embodiment.

FIG. 9 is a schematic perspective view of the heat dissipating element 30 in accordance with yet another exemplary embodiment. In the illustrated embodiment, the sheet-like element 32 is segmented along the longitudinal direction to form a plurality of segments 38. The plurality of segments 38 is disposed proximate to each other or spaced apart from each other. As discussed previously, the segmentation of the sheet-like element 32 impedes continuous heat conduction along the longitudinal direction 'a' of the heat dissipating element 30. Heat is conducted from the component to the heat dissipating element 30. Specifically, heat flows along faces 31, 33 of the heat dissipating element 30.

Figure 10:
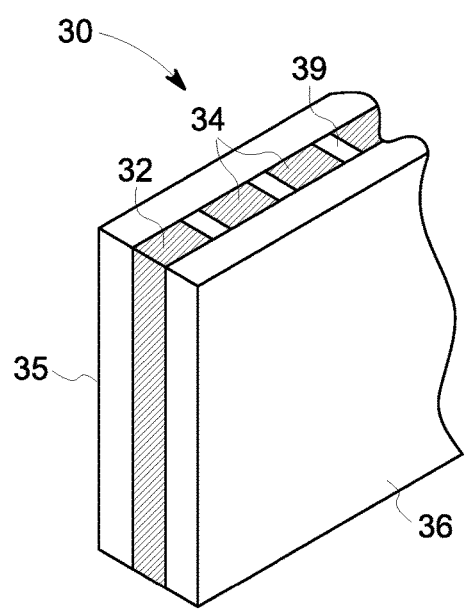
FIG. 10 is a perspective view of a heat dissipating element in accordance with yet another embodiment.

FIG. 10 is a schematic perspective view of the heat dissipating element 30 in accordance with yet another exemplary embodiment. In the illustrated embodiment, the sheet-like element 32 is interdisposed between the electrically insulating layers 35 and 36. The sheet-like element 32 is segmented along the longitudinal direction to form the plurality of segments 34 which are spaced apart from each other by a gap 39. In some embodiments, an electrically insulating material may be disposed in the gap 39 between the two adjacent segments 34.

In some embodiments, the segments 34 are spaced apart from each other along the central longitudinal axis 12. In some embodiments, segments 34 may be disposed at different locations within the field coil. The segmentation of heat dissipating element 30 impedes the continuous heat conduction along the longitudinal direction and permits heat conduction along the radial direction 40 of the component 10.

Figure 11:
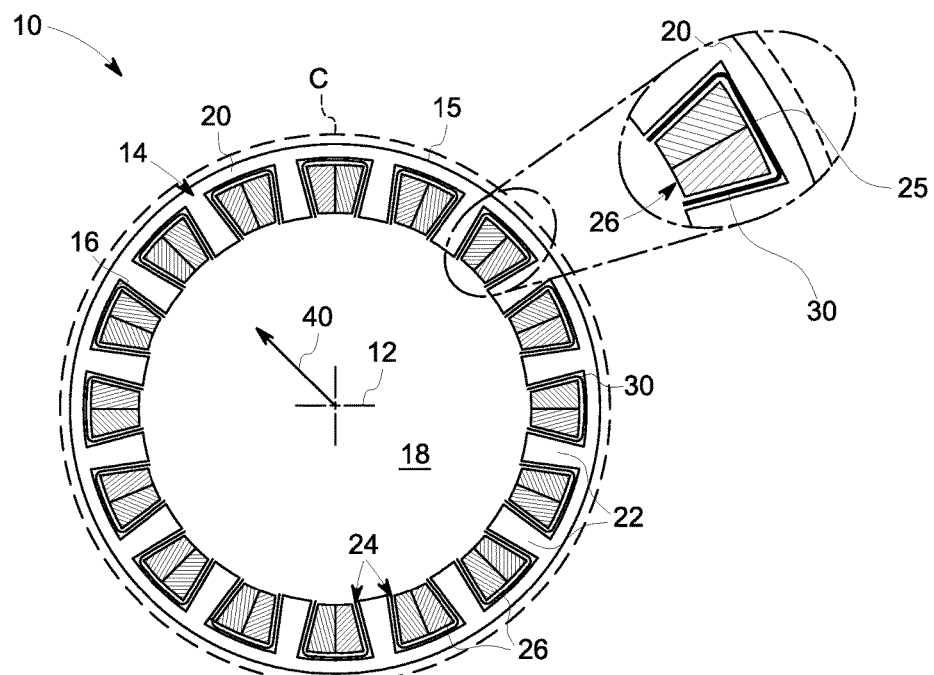
FIG. 11 is a schematic cross-sectional view of the component of FIG. 2 in accordance with one embodiment.

FIG. 11 shows a schematic cross-sectional view of the component 10 in accordance with yet another embodiment. The illustrated embodiment is similar to the embodiment of FIG. 4 except that the heat dissipating element 30 is disposed in form of a slot liner in at least one slot 24 of the component 10. Specifically, the heat dissipating element 30 is disposed along an inner surface 25 of the slot 24. In other words, the heat dissipating element 30 conforms to the shape of the slot 24. In some embodiments, the heat dissipating element 30 is disposed within the slot 24 and extends along the central longitudinal axis 12. In some embodiments, the heat dissipating element 30 includes the sheet-like element interdisposed between the electrically insulating layers to electrically isolate the coil 26 from the core 14.

Figure 12:
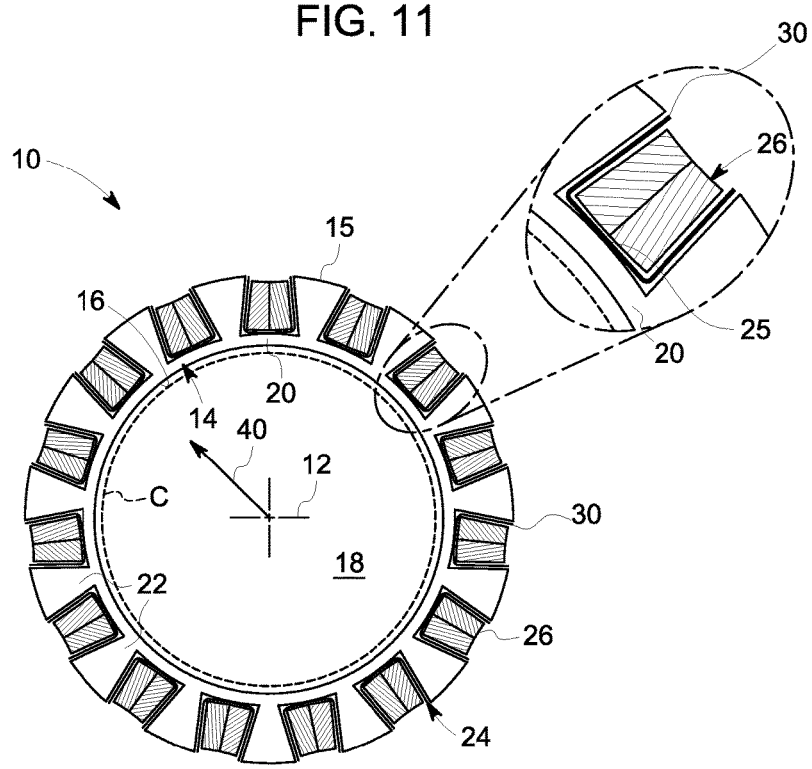
FIG. 12 is a schematic cross-sectional view of a component of FIG. 3 in accordance with one embodiment.

FIG. 12 shows a schematic cross-sectional view of the component 10 in accordance with yet another embodiment. The illustrated embodiment is similar to the embodiment of FIG. 5 except that the heat dissipating element 30 is disposed in the form of a slot liner in at least one slot 24 of the component 10.

In embodiments where the heat dissipating element 30 is disposed in the form of a slot liner in at least one slot 24 of the component 10 (as shown in FIGS. 11 and 12), the heat dissipating element 30 may include the sheet-like element 32 interdisposed between the pair of electrically insulating layers 35, 36, as shown in FIGS. 8 and 9.

With references to FIGS. 3-12, although specific configurations are shown, combinations of such configurations are also envisioned. The component 10 may be a stator and/or a rotor of an electrical machine. The number of heat dissipating elements 30 used in the electrical machines, may vary depending on the application.

Figure 13:
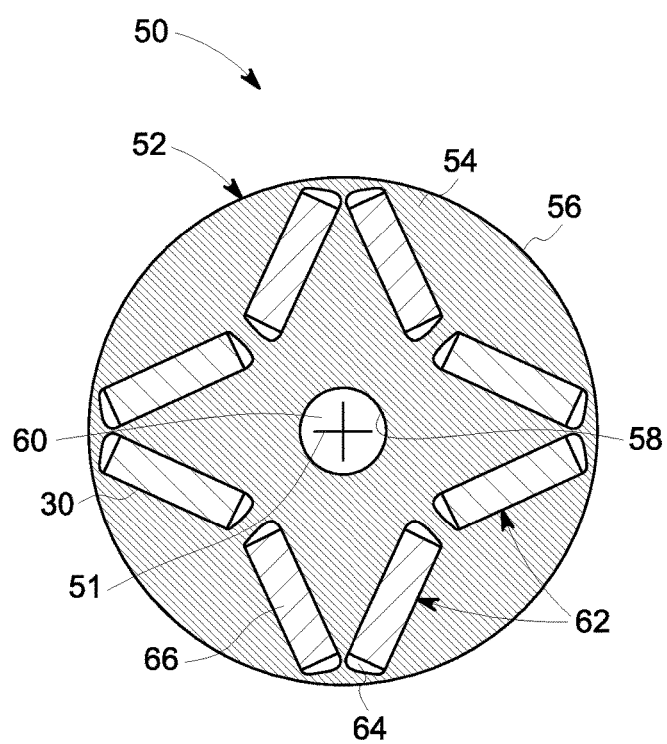
FIG. 13 is a schematic cross-sectional of a rotor in accordance with one embodiment.

FIG. 13 illustrates a schematic cross sectional view of a component 50 in accordance with an embodiment. In the illustrated embodiment, the component 50 is an interior permanent magnet rotor. The rotor 50 includes a cylindrical rotor core 52 configured to rotate about a central longitudinal axis 51. The rotor 50 includes a rotor yoke 54 having an outer surface 56 and an inner surface 58 that defines a central opening 60. The rotor core 52 may be formed of a plurality of circular laminations (not shown) stacked one over the other. In some embodiments, the rotor core 52 may be formed of a single piece of material.

The rotor core 52 further includes a plurality of poles 62 located within the rotor yoke 54. The rotor core 52 also includes a plurality of slots 64. A plurality of permanent magnets 66 is disposed within the slots 64 of the rotor core 52. In the illustrated embodiment, the rotor core 52 includes two slots 64 in each of the four quadrants of the cylindrical rotor yoke 54. Two permanent magnets 66 in each quadrant form a pole 62.

The heat dissipating element 30 is disposed on at least one side/surface of the permanent magnets 66. In some embodiments, the heat dissipating element 30 is disposed around the permanent magnets 66. In some embodiments, the permanent magnet 66 includes a laminate of thin sheets. In such embodiments, the heat dissipating element 30 is disposed between adjacent thin sheets of the laminate.

Figure 14:
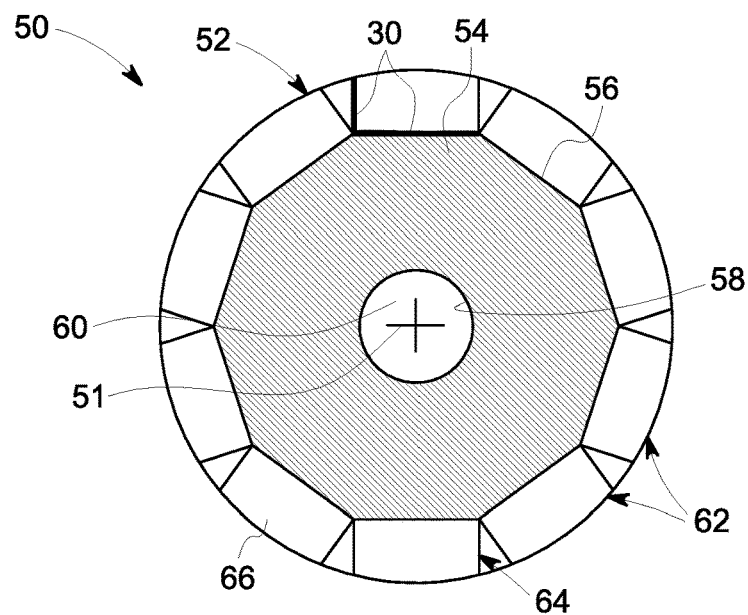
FIG. 14 is a schematic cross-sectional of a rotor in accordance with another embodiment.

FIG. 14 is a schematic cross-sectional view of a rotor 50 in accordance with another embodiment. In the illustrated embodiment, the rotor 50 is a surface permanent magnet rotor. The plurality of poles 62 is disposed on an outer surface 56 of the rotor yoke 54. The rotor core 52 includes the plurality of permanent magnets 66 disposed in the plurality of slots 64 formed on the outer surface 56 of the rotor yoke 54. The rotor 50 further includes the heat dissipating element 30 disposed in contact with the permanent magnets 66 within the slots 64. In one embodiment, the heat dissipating element 30 is disposed on at least one surface of each permanent magnet 66 in the corresponding slot 64.

Figure 15:
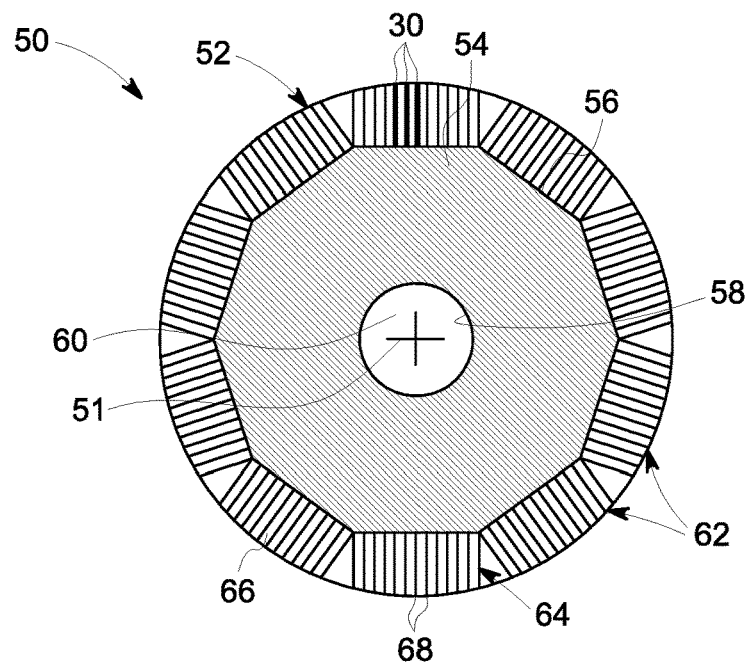
FIG. 15 is a schematic cross-sectional view of a rotor in accordance with another embodiment.

FIG. 15 is a schematic cross-sectional view of a rotor 50 in accordance with another embodiment. In the illustrated embodiment, each permanent magnet 66 includes a laminate having a plurality of thin sheets 68. The heat dissipating element 30 is disposed between a pair of thin sheets 68 of the laminate.

In accordance with the embodiments discussed herein, the heat dissipating element includes a thermally conductive material having a high in-plane conductivity. The heat dissipating element enhances heat conduction along a desired direction (for example, radial direction) of the component.

While only certain features of the invention have been illustrated and/or described herein, many modifications and changes will occur to those skilled in the art. Although individual embodiments are discussed, the present invention covers all combination of all of those embodiments. It is understood that the appended claims are intended to cover all such modification and changes as fall within the intent of the invention.

The invention claimed is:

1. A component of an electrical machine, the component comprising:
   a magnetic core comprising teeth defining a plurality of slots, wherein each slot from the plurality of slots is defined between corresponding pair of adjacent teeth;
   a conduction winding wound around each tooth of the teeth such that each slot accommodates two conduction windings; and
   a heat dissipating element disposed in a slot of the plurality of slots between the two conduction windings, wherein the heat dissipating element comprises a thermally conducting material having an in-plane thermal conductivity higher than a through-plane thermal conductivity and wherein the heat dissipating element comprises a sheet-like element having a largest plane substantially parallel to a radial direction of the component.

2. The component of claim 1, wherein the thermally conducting material comprises graphite.

3. The component of claim 1, wherein the heat dissipating element comprises a pair of electrically insulating layers, wherein the sheet-like element is interdisposed between the pair of electrically insulating layers.

4. The component of claim 1, wherein the sheet-like element comprises a plurality of segments disposed proximate to each other.

5. The component of claim 4, wherein the plurality of segments are spaced apart from each other by a gap.

6. The component of claim 1, wherein the component is a rotor.

7. The component of claim 1, wherein the component is a stator.

8. A component of an electrical machine comprising:
   a magnetic core comprising teeth defining a plurality of slots, wherein each slot from the plurality of slots is defined between corresponding pair of adjacent teeth;
   a conduction winding disposed in at least one of the plurality of slots; and
   a heat dissipating element disposed within the conduction winding, wherein the heat dissipating element comprises a thermally conducting material having an in-plane thermal conductivity higher than a through-plane thermal conductivity.

9. The component of claim 8, wherein the heat dissipating element comprises a sheet-like element comprising the thermally conducting material.

10. The component of claim 9, wherein the sheet-like element comprises a plurality of segments disposed proximate to each other.

11. The component of claim 10, wherein the plurality of segments are spaced apart from each other by a gap.

12. The component of claim 9, wherein the sheet-like element comprises a plurality of segments disposed at different locations within the conduction winding.

13. A rotor of an electrical machine comprising:
a rotor core comprising a plurality of slots;
a permanent magnet disposed in a slot from the plurality of slots, wherein the permanent magnet comprises a plurality of thin sheets; and
a heat dissipating element interdisposed between a pair of thin sheets from the plurality of thin sheets, wherein the heat dissipating element comprises a thermally conducting material having an in-plane thermal conductivity higher than a through-plane thermal conductivity.

14. The rotor of claim 13, wherein the heat dissipating element comprises a sheet-like element comprising the thermally conducting material and wherein a largest plane of the sheet-like element is substantially parallel to a radial direction of the component.

15. The rotor of claim 13, wherein the thermally conducting material comprises graphite.

16. The component of claim 8, wherein the thermally conducting material comprises graphite.

17. The component of claim 9, wherein a largest plane of the sheet-like element is substantially parallel to a radial direction of the component.

* * * * *